(12) United States Patent
Azizi (10) Patent No.: US 7,711,704 B2
(45) Date of Patent: May 4, 2010

(54) SYSTEM AND METHOD OF PROVIDING DATE, ARITHMETIC AND OTHER RELATIONAL FUNCTIONS FOR OLAP SOURCES

(75) Inventor: Soufiane Azizi, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 11/412,634

(22) Filed: Apr. 27, 2006

(65) Prior Publication Data

US 2007/0061305 A1 Mar. 15, 2007

(30) Foreign Application Priority Data

Sep. 13, 2005 (CA) .................................... 2519021

(51) Int. Cl.
*G06F 7/00* (2006.01)
*G06F 17/00* (2006.01)
(52) U.S. Cl. ......................... 707/600; 707/705
(58) Field of Classification Search ...................... 707/3, 707/4, 2, 100, 104.1
See application file for complete search history.

(56) References Cited

U.S. PATENT DOCUMENTS

| | | | | |
|---|---|---|---|---|
| 6,609,123 B1 * | 8/2003 | Cazemier et al. | ............... | 707/4 |
| 6,865,567 B1 * | 3/2005 | Oommen et al. | ............... | 707/2 |
| 7,010,523 B2 * | 3/2006 | Greenfield et al. | ............. | 707/3 |
| 7,233,939 B1 * | 6/2007 | Ziauddin | ........................ | 707/2 |
| 7,321,888 B2 * | 1/2008 | Day et al. | ....................... | 707/2 |
| 7,363,287 B2 * | 4/2008 | Kilmer et al. | ................... | 707/2 |
| 2002/0198867 A1 * | 12/2002 | Lohman et al. | ................. | 707/3 |
| 2005/0033741 A1 * | 2/2005 | Dombroski et al. | ............ | 707/3 |
| 2005/0060292 A1 * | 3/2005 | Day et al. | ....................... | 707/3 |
| 2006/0294087 A1 * | 12/2006 | Mordvinov | .................... | 707/4 |
| 2007/0050348 A1 * | 3/2007 | Aharoni et al. | ................. | 707/4 |
| 2007/0208721 A1 * | 9/2007 | Zaman et al. | ................... | 707/4 |

* cited by examiner

Primary Examiner—John E. Breene
Assistant Examiner—Giovanna Colan
(74) Attorney, Agent, or Firm—Patterson & Sheridan, LP (57) ABSTRACT

A tabular operation provider is provided for processing a data agnostic business intelligence query with relational operations, herein called a relational query against a multidimensional datasource. The tabular operation provider comprises a query interceptor, a query decomposer and a query replacer. The query interceptor detects and intercepts a relational query that is issued against one or more multidimensional data sources. The query decomposer decomposes expressions of the relational query into one multidimensional expression and one or more relational expressions. The query replacer replaces the relational query with a stack of operations expressed by the decomposed multidimensional expressions and/or the relational expressions.

9 Claims, 11 Drawing Sheets

| Year | Product line | Revenue |
|---|---|---|
| 2004 | Camping Equipment | $20,471,328.88 |
| 2004 | Golf Equipment | $5,597,980.86 |
| 2004 | Mountaineering Equipment | $0.00 |
| 2004 | Outdoor Protection | $1,536,456.24 |
| 2004 | Personal Accessories | $7,144,797.52 |
| 2005 | Camping Equipment | $31,373,606.46 |
| 2005 | Golf Equipment | $9,598,268.88 |
| 2005 | Mountaineering Equipment | $9,642,674.54 |
| 2005 | Outdoor Protection | $988,230.64 |
| 2005 | Personal Accessories | $10,955,708.04 |
| 2006 | Camping Equipment | $37,869,055.58 |
| 2006 | Golf Equipment | $10,709,215.84 |
| 2006 | Mountaineering Equipment | $11,248,676.06 |
| 2006 | Outdoor Protection | $646,428.04 |
| 2006 | Personal Accessories | $13,793,960.30 |
| Summary | | $171,576,387.88 |

Figure 11 ial processing (OLAP) sources.
SYSTEM AND METHOD OF PROVIDING DATE, ARITHMETIC AND OTHER RELATIONAL FUNCTIONS FOR OLAP SOURCES

FIELD OF INVENTION

The present invention relates generally to a system and method for processing high level user requests containing one or more queries, and in particular to a system and method of providing date, arithmetic, and other functions for online analytical processing (OLAP) sources.

BACKGROUND OF THE INVENTION

Many organizations use data stores for storing business data, such as financial data and operational data. In order to assist business users to examine their data, various data analyzing applications are proposed. Those data analyzing applications provide various views or reports of data to users. Those data analyzing applications typically have query engines that access the data stores to obtain desired data. The accessed data stores can be either relational or multidimensional stores, which are based on fundamentally different data storage technologies.

Those data analyzing applications issue requests of data from the data stores. A request may contain data agnostic business intelligence (BI) queries that may express date, arithmetic, string manipulation, and other relational style operations. BI users can make such computations on relational data. There is a need for the ability to do the same computation natively on OLAP or dimensional data. Presently, users have had to extract dimensional data, transform, and load it (ETL) into other systems that provide such computation (MS Excel™ for example). This ETL route is time consuming, requires the interventions of IT departments in large organizations, is error prone, and is inefficient compared to being able to perform such computation in the BI system directly.

Some data analyzing applications have Online Analytical Processing (OLAP) query engines to allow users to analyze multidimensional views of data. This type of OLAP is sometimes called Multidimensional OLAP (MOLAP). A MOLAP engine summarizes business data into multidimensional views in advance, and places the summarized data in a cube structure. When a user request is received, the MOLAP engine accesses the summarized data, and thus the MOLAP engine can provide a response to the query very fast. The user can rotate the cube structured data to see a desired view of the data using the MOLAP engine.

There also exist Relational OLAP (ROLAP) query engines that extract data from traditional relational databases. ROLAP engines are able to create multidimensional views on the fly. In order to extract data, those ROLAP engines typically use complex Structured Query Language (SQL) statements against relational tables in the relational databases. ROLAP engines tend to be used on data that has a large number of attributes, where the data cannot be easily placed into a cube structure. ROLAP engines support multidimensional queries issued against relational databases. Some ROLAP engines translate OLAP queries into SQL queries, and other ROLAP query engines implement the access to relational databases using internal communication between components responsible for OLAP and relational operations.

Both MOLAP and ROLAP approaches to the multidimensional data access, even though they use different data storage technologies, provide only the functionality of the multidimensional query language. This query language has a number of significant limitations when it comes to providing relational style operations, such us date, arithmetic and string manipulation operations.

On the other side is the relational query language, SQL, providing a powerful set of operations that manipulate data in accordance with the relational algebra. This set of operations includes the relational style operations that are not natively supported by the multidimensional technologies, including date, arithmetic, and string manipulations. While SQL is ideal for processing transactional data, it has a number of significant limitations when it comes to data analysis and reporting.

SUMMARY OF THE INVENTION

The present invention intercepts a data agnostic business intelligence (BI) query that has relational style operations that is issued against one or more multidimensional data sources, and decomposes it into sub-queries to execute the query.

It is an object of the invention to provide an improved system and method for decomposition of a data agnostic business intelligence query against one or more multidimensional data sources.

According to the present invention there is provided a tabular operation provider for processing a data agnostic business intelligence query that has relational style operations that are not supported natively by the underlying multidimensional data sources. The tabular operation provider comprises a query interceptor, a query decomposer and a query replacer. The query interceptor is provided for detecting and intercepting a data agnostic Business intelligence query that has relational style operations that is issued against one or more multidimensional data sources. The query decomposer is provided for decomposing expressions in the input query into one or more relational expressions and one or more multidimensional expressions. The query replacer is provided for replacing the input query with a stack of operations expressed by the decomposed relational expressions and the multidimensional expressions.

In accordance with another aspect of the present application, there is provided a query decomposer for decomposing data agnostic business intelligence queries that contain relational style operations. The query decomposer comprises a sub-expression identifier and a sub-query creator for creating an OLAP query provider (OQP) sub-query and a relational query provider (RQP) sub-query. The sub-expression identifier is provided for identifying if one or more parts of an expression is a relational style operation that is not supported by the OLAP Query Provider. The sub-query creator is provided for creating an OLAP Query Provider (OQP) sub-query based on the parts of expressions that are supported by OQP. The sub-query creator is also provided for creating an RQP sub-query based on the original query.

In accordance with another aspect of the present application, there is provided a method of processing a data agnostic business intelligence query against one or more data sources. The method comprises steps of detecting and intercepting a data agnostic business intelligence query that is issued against one or more multidimensional data sources; decomposing expressions of the data agnostic business intelligence query into one or more multidimensional expressions and one or more relational expressions; and replacing the data agnostic business intelligence query with a stack of operations expressed by the decomposed multidimensional expressions and the relational expressions for execution of the operations.

In accordance with another aspect of the present application, there is provided a method of decomposing a data agnostic business intelligence query applied against one or more multidimensional data sources. The method comprises the steps of identifying one or more parts of expressions as relational style sub-expressions that are not supported by an OLAP query provider that is capable of executing OLAP style queries, extracting the identified relational style sub-expressions into RQP data items, creating a OQP data items that replace the identified relational style sub-expressions.

In accordance with another aspect of the present application, there is provided a memory containing computer executable instructions that can be read and executed by a computer for caring out a method of processing a data agnostic business intelligence query against one or more data source. The method comprises the steps of detecting and intercepting a data agnostic business intelligence query that is issued against one or more multidimensional data sources; decomposing expressions of the data agnostic business intelligence query into one or more multidimensional expressions and one or more relational expressions; and replacing the data agnostic business intelligence query with a stack of operations expressed by the decomposed multidimensional expressions and the relational expressions for execution of the operations.

In accordance with another aspect of the present application, there is provided a carrier carrying a propagated signal containing computer executable instructions that can be read and executed by a computer, the computer executable instructions being used to execute a method of processing a data agnostic business intelligence query against one or more data source, the method comprising the steps of detecting and intercepting a data agnostic business intelligence query that is issued against one or more multidimensional data sources; decomposing expressions of the data agnostic business intelligence query into one or more multidimensional expressions and one or more relational expressions; and replacing the data agnostic business intelligence query with a stack of operations expressed by the decomposed multidimensional expressions and/or the relational expressions for execution of the operations.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

The present invention allows for the computation of time, arithmetic, and other business functions for data extracted from OLAP (or multidimensional) sources that do not support these computations natively.

Figure 1:
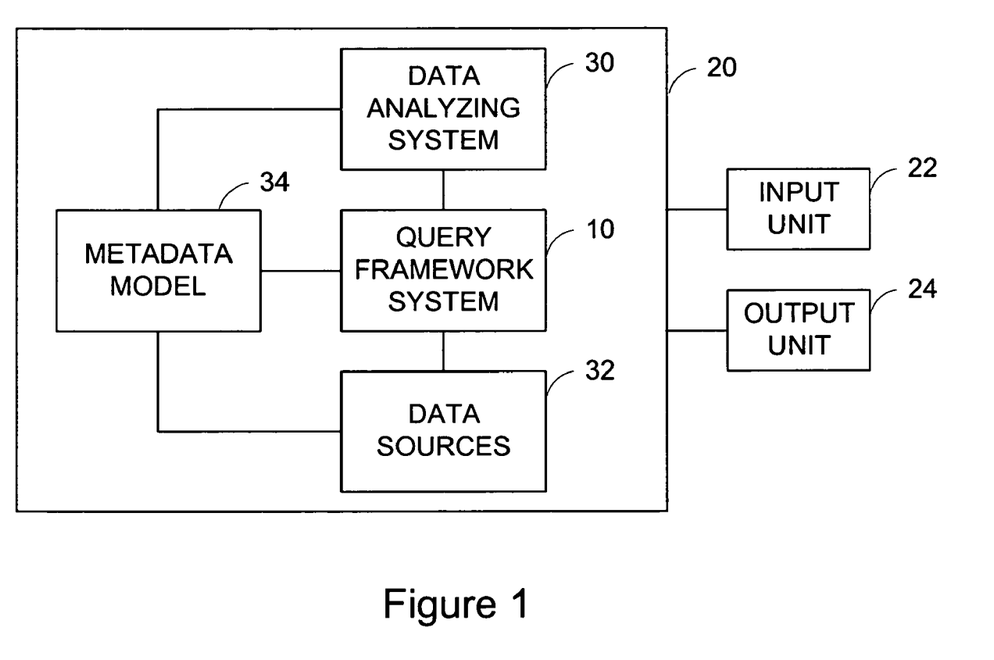
FIG. 1 shows in a block diagram an example of a query framework system in which an example of a tabular operation provider is suitably used, in accordance with an embodiment of the present invention.
Figure 2:
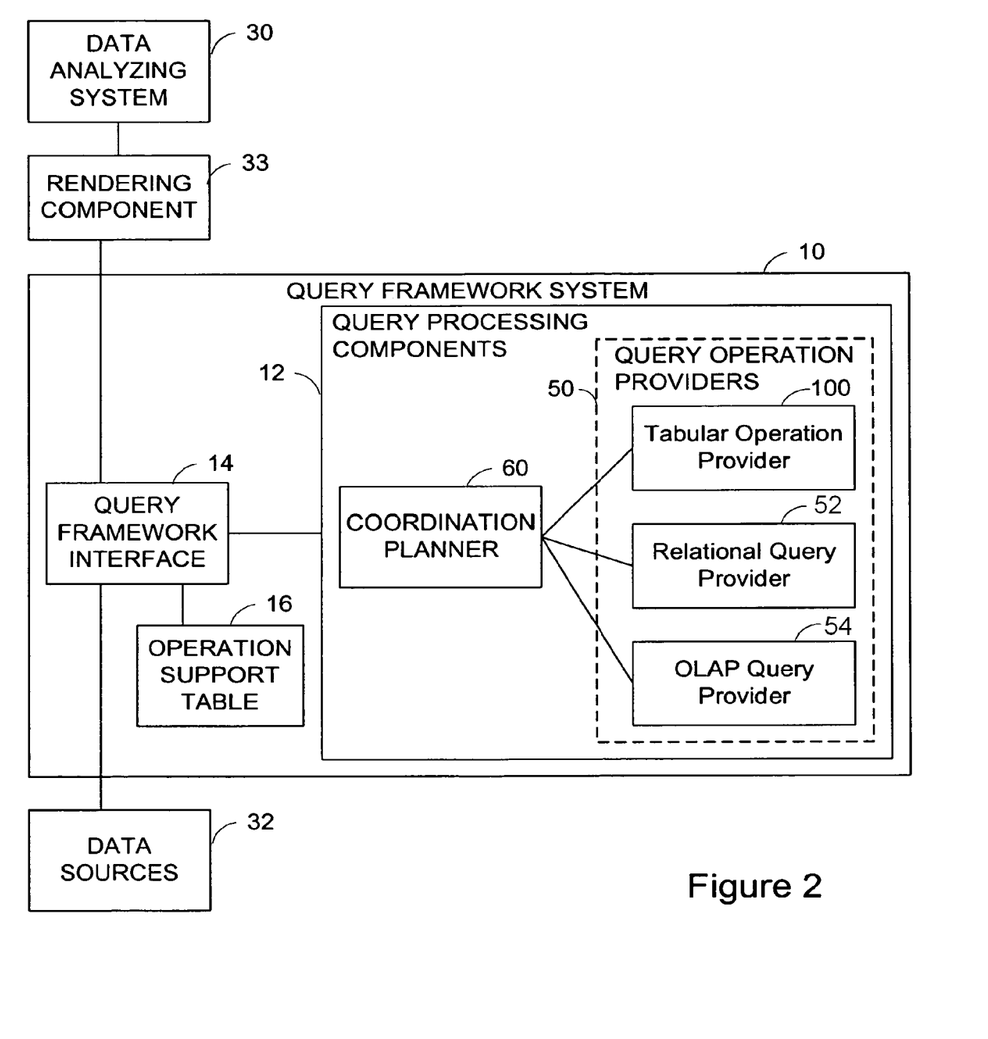
FIG. 2 shows in a block diagram the query framework system in more detail.

FIGS. 1 and 2 show a query framework system 10 in which a tabular operation provider 100 (FIG. 2) in accordance with an embodiment of the application is suitably used. The tabular operation provider 100 may be a standalone pluggable component as shown in FIG. 2, or a part of a component that processes high level user requests. The following descriptions describe an embodiment of the tabular operation provider as a standalone component, but the invention is not limited to such an embodiment.

The query framework system 10 is used in a computer system 20 having an input unit 22 and an output unit 24. The query framework system 10 is provided to receive user requests from a data analyzing system 30 and process the received user requests to retrieve requested data from one or more data sources 32.

The data analyzing system 30 is an application that provides various views of data in the data sources 32 to allow users to analyze the data. When a user requests a view of data, the data analyzing system 30 generates a user request. A user request typically contains multiple queries. To generate user requests, the data analyzing system 30 may use a metadata model 34 that contains metadata of the data sources 32. The user request is in a query language that the data analyzing system 30 uses to issue the user request. Some data analyzing system 30 may issue a user request in a data source language, such as SQL, and some data analyzing system 30 may issue a user request in a language specific to the data analyzing system 30.

The data analyzing system 30 issues user requests in a data agnostic querying language or specification. The data agnostic querying specification allows combining query elements involving relational operations and OLAP operations. Accordingly, a data agnostic query issued by the data analyzing system 30 may involve both relational and OLAP operations, only relational operations, or only OLAP operations.

The query framework system 10 intercepts user requests generated by the data analyzing system 30. It processes and executes the user requests to retrieve desired data from the data sources 32.

As shown in FIG. 2, the query framework system 10 has multiple query processing components 12. Query processing components 12 share a common interface 14 and a common query language of the query framework system 10. Query processing components 12 are pluggable components. Query processing components 12 include a set of query operation providers 50, and a coordination planner 60. The query framework system 10 may also have an operation support table 16 that describes functionalities of the query operation providers 50.

The coordination planner 60 organizes interaction between the query processing components 12. The interaction is carried out through the common interface 14 and based on the common query language. The coordination planner 60 divides the query processing into two phases: query planning or preparation phase and a query execution phase. During the query preparation phase, the coordination planner 60 interacts with components in order to identify and plan the operations associated with each component involved in the query preparation process, and to determine the sequence of these operations. The coordination planner 60 may use one or more query operation providers 50 during the query preparation phase. During the query execution phase, the coordination planner 60 distributes the query operations to associated query operation providers 50. The coordination planner 60 invokes the query operations in the sequence determined at the preparation phase.

During the preparation phase, the coordination planner 60 converts a user request received from the data analyzing system 30 into a converted query or a query framework (QF) query. A QF query plays the role of a query specification that the query operation providers 50 use to communicate to each other and to the coordination planner 60 within the query framework system 10. The QF query definition is an extension of the user request specification defined by the data analyzing system 30. The coordination planner 60 and the query framework system 10 are further described in Canadian Patent Application No. 2,518,902 entitled "System and Method for Query Planning and Execution", which is hereby incorporated by reference.

Each query operation provider 50 is capable of performing a specific operation on queries. The query operation providers 50 include a relational query provider 52, OLAP query provider 54, and the tabular operation provider 100. There may be more query operation providers in the query framework system 10.

The OLAP query provider 54 is capable of processing OLAP queries, i.e. queries of the system query language involving OLAP operations only. Date, arithmetic, string manipulation, and other relational type operations are not supported by the OLAP query provider. The operation of the OLAP query provider 54 involves translation of the system query language into the query language of underling multidimensional data sources 32, which is MDX.

The relational query provider 52 is capable of processing relational queries. It provides tabular operations to received queries. The operation of the relational query provider 52 involves translation of the system query language into the query language of underling relational data sources 32, which is SQL. The relational query provider is also capable of receiving the data upon which the relational queries act. The operations in the input relational queries are applied to the input data stream.

The tabular operation provider 100 is a query transformation component plugged into the query framework system 10 governed by the coordination planner 60. The tabular operation provider is a transformation provider which is responsible for preprocessing of the received user request, and transforms the received user request into a QF query in order, for example, to make it simpler or supported by other components in the query framework system 10.

The tabular operation provider 100 uses a query decomposition process that bridges between functionality available in relational operations and multidimensional operations. It allows relational style functions, such us date arithmetic and string manipulation, against multidimensional data sources that do not natively support these relational style functions.

The tabular operation provider 100 plays part in data agnostic user experience, e.g., the same look and feel against relational and multidimensional data sources, including the set of functions shared across multidimensional and relational data sources. The tabular operation provider 100 allows the relational and multidimensional operations combined in a single query. In this embodiment, the logic of the query decomposition is implemented as a tabular operation provider 100 which is a pluggable component in the query framework system 10. Accordingly, its functionality can be reused for different variations of data sources. Also, its behavior may be tweaked in the system 10 by pre-processing incoming queries or post-processing the results of the decomposition. In a different embodiment, the functionality of the tabular operation provider 100 may be incorporated into other component.

Figure 3:
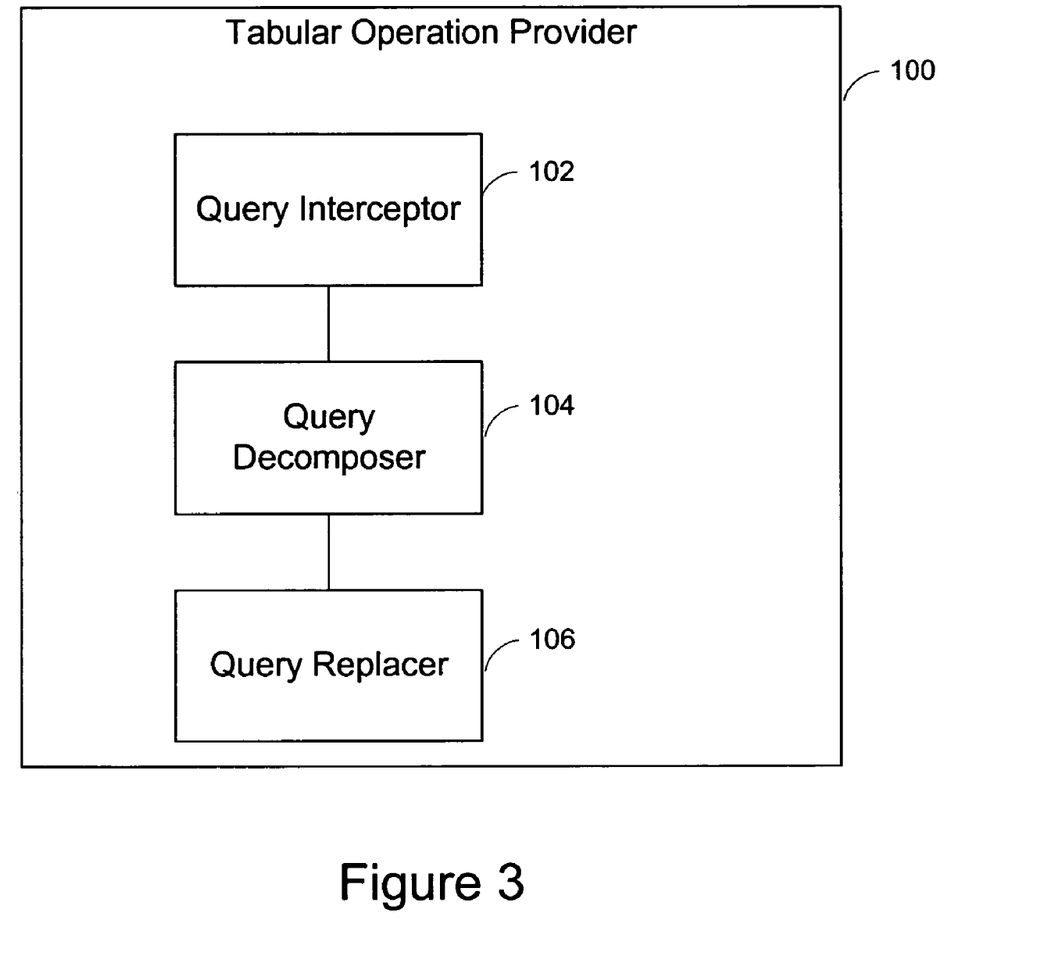
FIG. 3 shows in a block diagram an example of a tabular operation provider, in accordance with an embodiment of the present invention.

As shown in FIG. 3, the tabular operation (or function) provider 100 has a query interceptor 102, query decomposer 104, and a query replacer 106. The query interceptor 102 detects and intercepts queries requiring its involvement, the main type of which is queries with date, arithmetic and string manipulation operations issued against multidimensional data sources 32. The query decomposer 104 decomposes these queries into three sub-queries or specifications, as further described below. The query replacer 106 replaces the initial query with the stack operations expressed with the three specifications. The query replacer 106 may include a multidimensional query provider interface for sending multidimensional queries to a multidimensional query provider and for receiving results, and a relational query interface for sending the results to a relational query provider.

Figure 4:
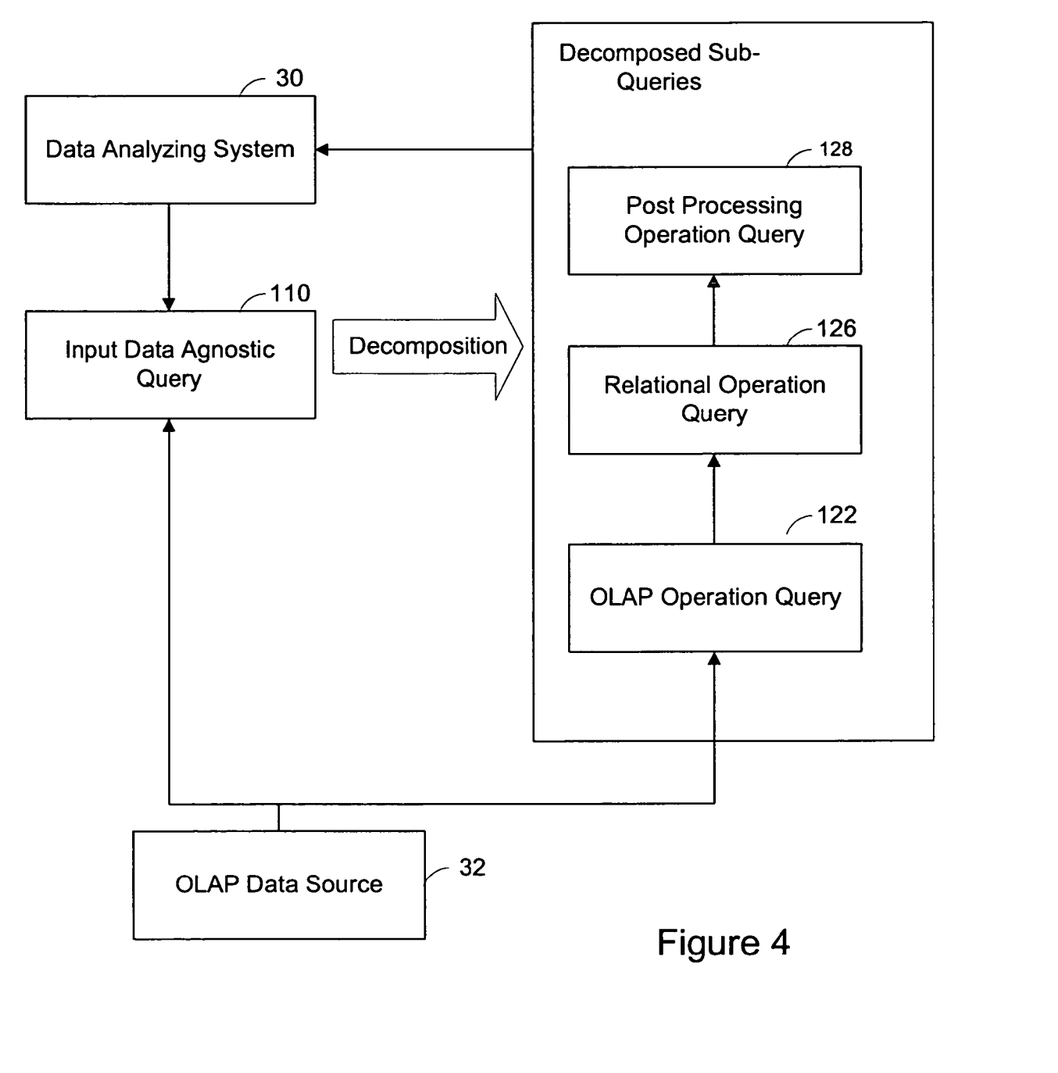
FIG. 4 schematically shows in a diagram the decomposition of a data agnostic business intelligence query, in accordance with an embodiment of the tabular operation provider.

FIG. 4 schematically illustrates an example of decomposition of a multidimensional query 110 intercepted by the tabular operation provider 100. The data agnostic input query 110 is decomposed into multiple specifications 120 including three specifications representing three types of sub-queries 120. The sub-queries 120 include an OLAP operation query 122, a relational operation query 126, and a post Processing operation query 128. The OLAP operation query 122 has a QF query specification that involves only OLAP operations. This query 122 is sent to the OLAP query provider 54 for execution. The relational operation query 126 has a QF query specification that involves only relational operations. This query 126 is sent to the relational query provider 52 for execution. The post processing operation query 128 is a query representing an operation of adjusting data set information to correspond to column information expressed in the metadata model rather than the structure of the input data stream that is extracted from the OLAP query provider and passed to the relational query provider. The post processing operation is handled by the tabular operation provider 100 itself.

Figure 5:
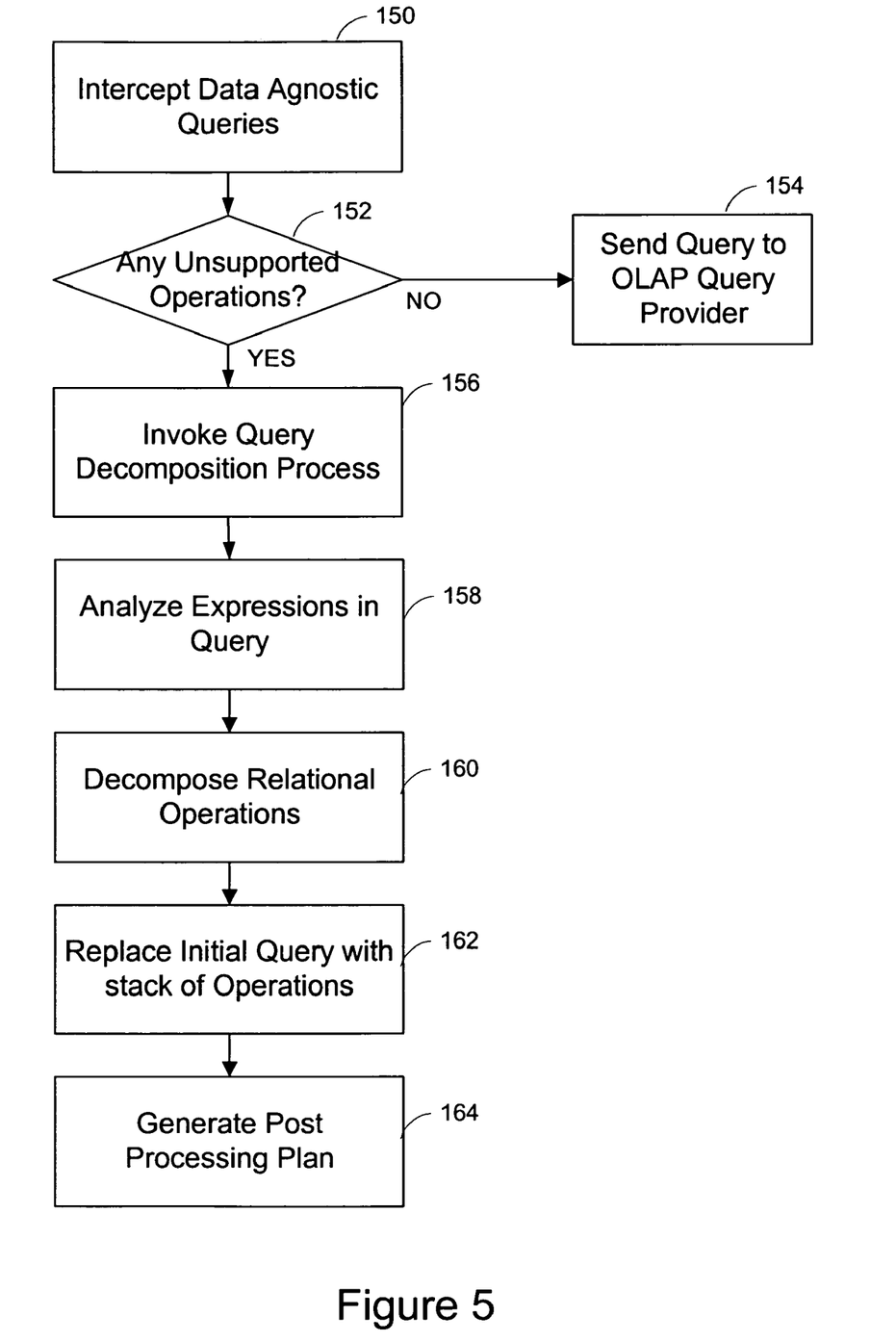
FIG. 5 shows in a flowchart the operation of the tabular operation provider.

Referring to FIG. 5, the operation of the tabular operation provider 100 and the decomposition rules are described. The tabular operation provider 100 detects and intercepts an input data agnostic query issued against the multidimensional data source 32 (150). The tabular operation provider 100 checks if the input data agnostic query involves operations that are unsupported by the OLAP query provider 52 (152). To determine if the operations are unsupported, the tabular operation provider 100 may use the operation support table 16 to refer to the functionalities that are supported by the OLAP query provider 54. If all operations involved in the input data agnostic query are supported by the OLAP query provider 54, the query is sent to the OLAP query provider 54 (154) by the coordination planner 60 for execution.

If the data agnostic query involves one or more operations that are unsupported by the OLAP query provider 54, the tabular operation provider 100 invokes the query decomposer 104 to decompose the input data agnostic query (156). The query decomposer 104 analyses each expression included in the input data agnostic query (158).

The query decomposer 104 decomposes expressions in the input data agnostic query. An expression is decomposed into or more multidimensional sub-expressions and one or more relational sub-expressions (160), as further described below. The query replacer 106 of the tabular operation provider 100 replaces the initial data agnostic query with stack of operations (162) based on the results of the decomposition of the query at step 160. Each operation is sent to a respective query provider 52, 54 by the coordination planner 60 for planning and execution.

The tabular operation provider 100 also performs a data set information post processing operation (164). The tabular operation provider adjusts the data set information to correspond to column information expressed in the metadata model rather than the structure of the input data stream that is extracted from the OLAP query provider and passed to the relational query provider.

Figure 6:
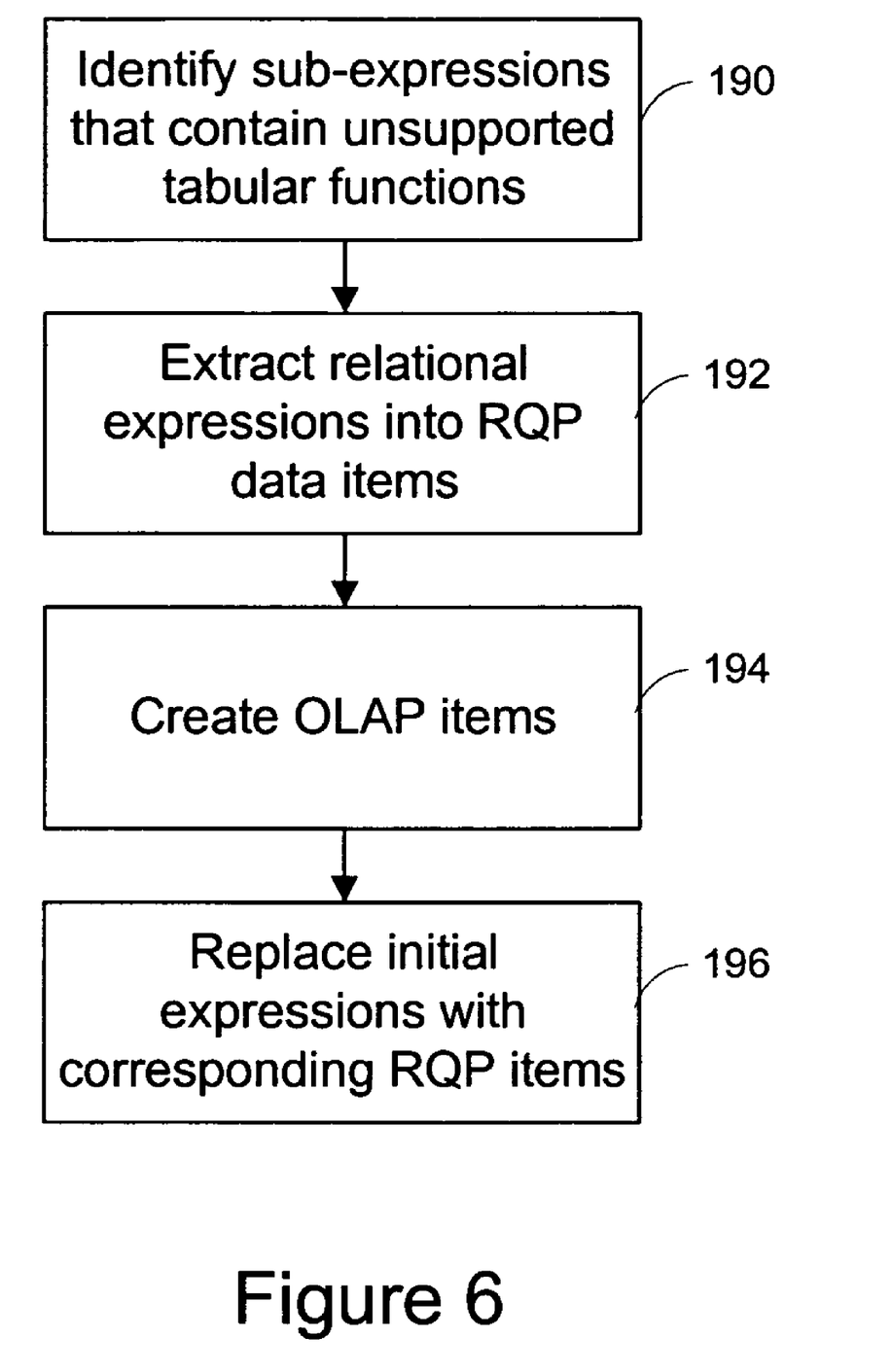
FIG. 6 shows in a flowchart a decomposition process by the tabular operation provider.

In order to perform the decomposition of expressions at step 160, as shown in FIG. 6, the query decomposer 104 may have to identify sub-expressions that contain unsupported tabular functions 190. The query decomposer 104 may then have to extract relational expressions into RQP data items 192. The query decomposer may then have to create OLAP items 194, and then replace original expressions with corresponding RQP items 196. The sub-expression identifier identifies one or more parts of each expression in the query that is not supported by the OLAP query provider, namely sub-expressions that contain relational style functions 190. The tabular expression extractor extracts these relational sub-expressions out of each original expression 192. The OLAP item creator creates one or more data items in the OQP query 194. The expression replacer replaces query items with identified relational sub-expressions with the corresponding RQP items 196.

Figure 7:
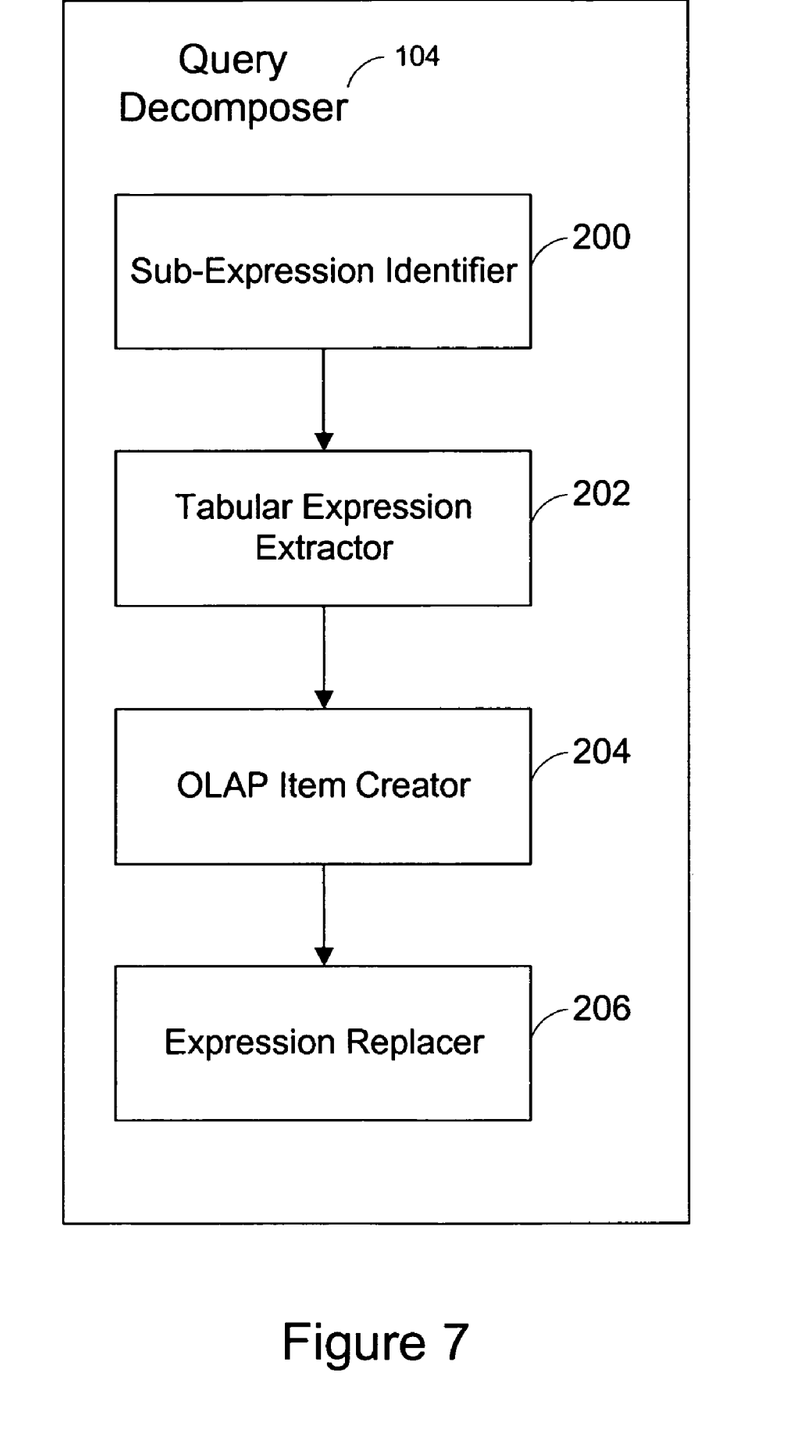
FIG. 7 shows in a block diagram a query decomposer in accordance with an embodiment of the tabular operation provider.

The decomposition may be carried out as shown in FIG. 7. The Sub-Expression Identifier 200 of the query decomposer 104 identifies one or more parts of expressions, i.e., sub-expressions, as unsupported by an OLAP query provider 54. The Tabular Expression Extractor 202 extracts relational style sub-expressions, such as date arithmetic and string manipulation, out of OQP's query, which in the process of further planning phase processing gets associated with the OLAP query provider 54. The OQP query is a flat list query that is a collection of all sub-expressions created as a result of decomposition of all individual expressions in the incoming query. The query decomposer 104 uses the OLAP Item Creator 204 in order to create one or more data items in the OQP query for each data item and filter expression in the data agnostic incoming query. Finally, the query decomposer 104 uses the Expression Replacer 206 in order to replace initial data item and filter expressions with corresponding RQP data items.

The created OQP query data items comprise an OQP operation query. This query is built to be flat and does not contain any grouping.

An example of software implementation of the tabular operation provider 100, TabularFuncProvider, in accordance with an embodiment of the invention is now described. In this embodiment, the query framework system 10 receives from the data analyzing system 30 a user request that has a <queryResultDefinition> section. Each expression in the user request is analyzed in the context of the <queryResultDefinition> section of the user request.

A QF query is denoted as QFQuery. QFQuery is the query specification used for communication between the coordination planner 60 and the query operation providers 50. QFQuery reflects the logical representation of a query specification at any step of the query planning process. The final version of QFQuery represents the query execution plan. The benefits of using QFQuery include that it allows reusing of existing specification and its interpretation rules, and leaving the choice to a planner provider to consume either high level or simplified (transformed) constructs of renditions of the user request.

The invocation of the tabular operation provider component is triggered by various factors. The tabular operation provider component is invoked when a QFQuery is posed against a multidimensional datasource and the query expresses some operations that are not natively supported by the data source. It indicates that the decomposition is to be performed on top of a multidimensional datasource, which currently means that a stream of data s to be extracted out of the dimensional data source and the unsupported operations are to be performed locally by the Query Framework system.

The tabular operation provider component is invoked when relational style expressions exist in the QFQuery. An expression is considered to contain relational features when the expression contains relational functions. Relational functions may be identified as such by either special property in the description of this function.

FIGS. 8 to 11 show in screenshots Examples of business functions handled by the tabular operation provider component, in accordance with an embodiment of the tabular operation provider 100.

Example 1

Figure 8:
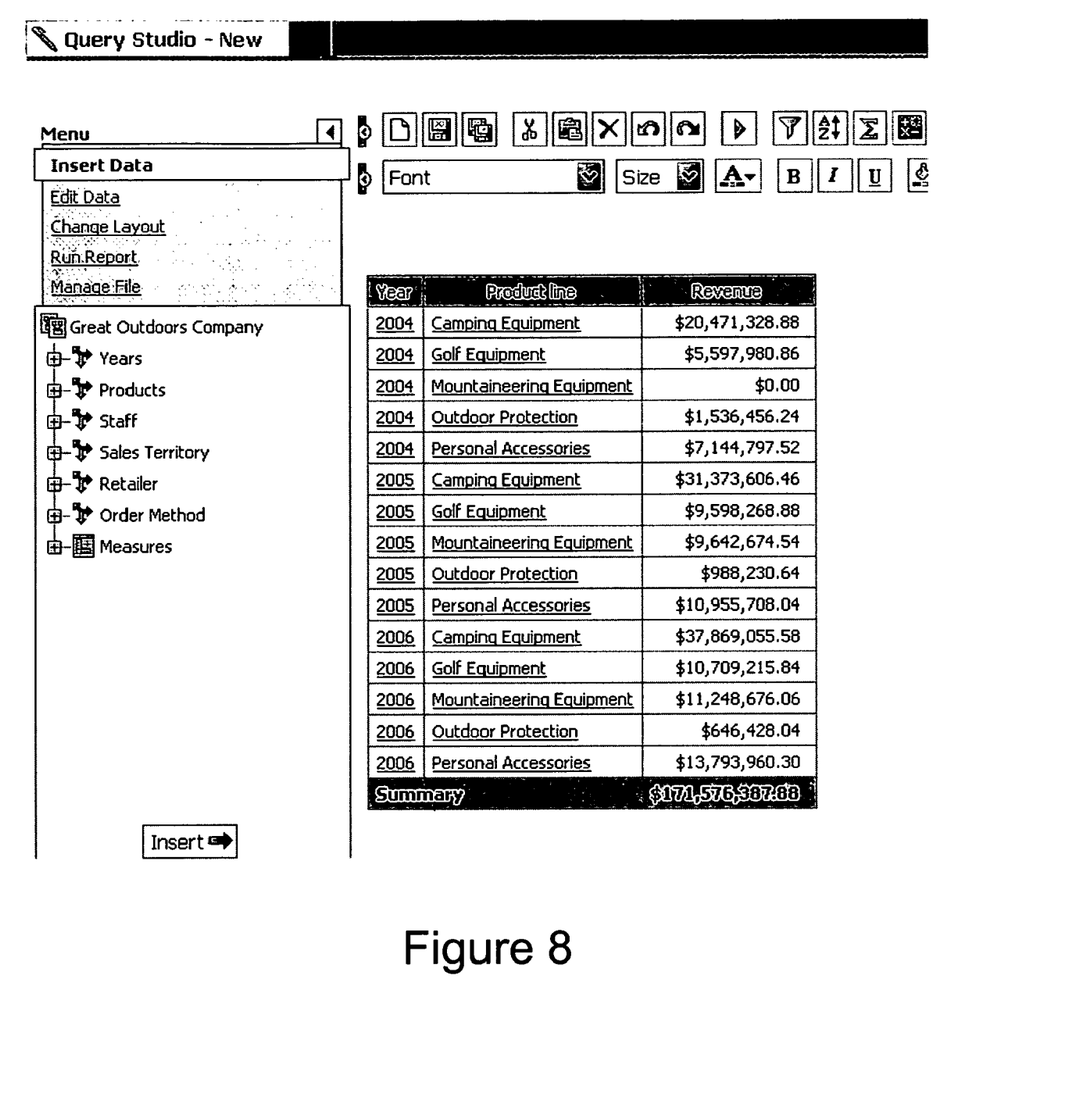
FIG. 8 shows in a screenshot an example of a report or a view of data stored in an example OLAP data store, whereby the report summarizes the revenue for each year and product line.

FIG. 8 shows in a screen shot an example report or a view of data stored in an example OLAP data store, whereby the report summarizes the revenue for each year and product line. The year and product line captions in each row of the report represent sting data type.

Example 2

Figure 9:
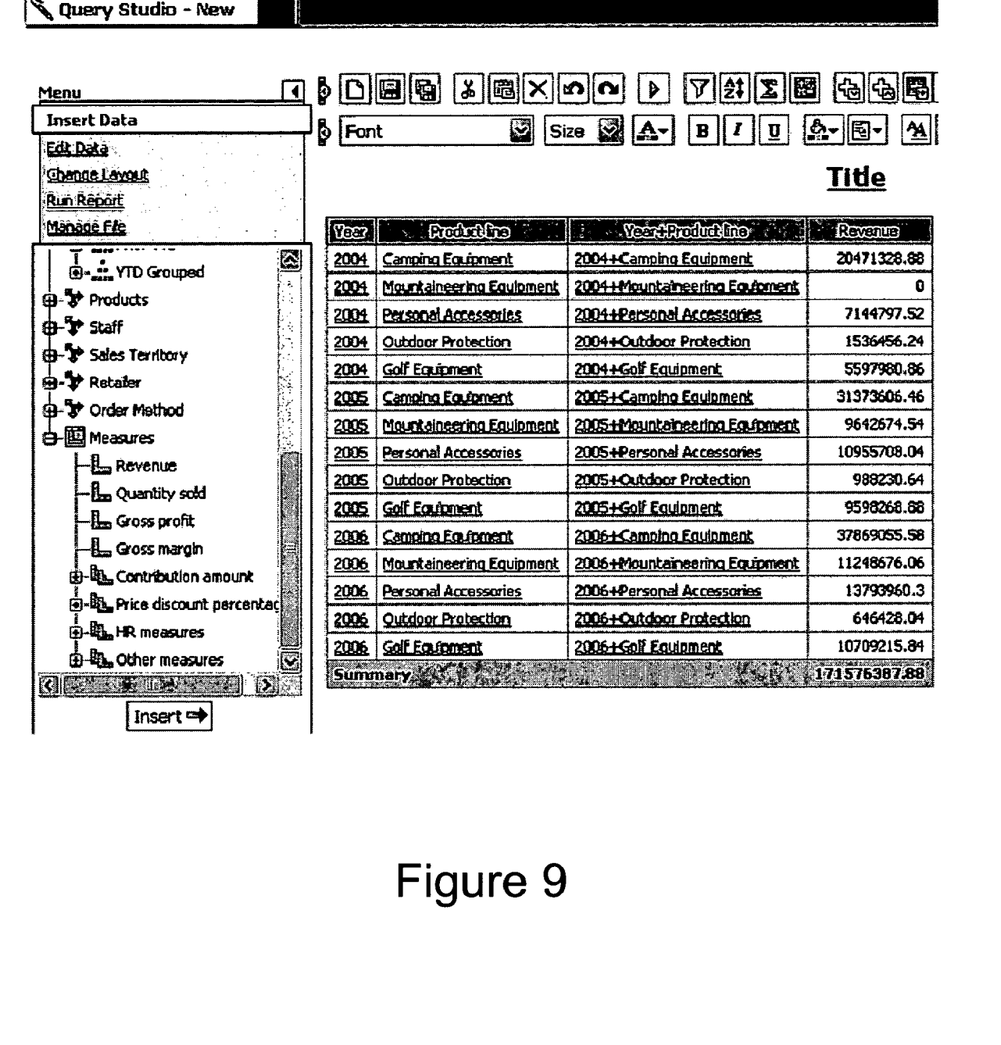
FIG. 9 shows in a screenshot the report as in FIG. 8 with a string function applied to the year and product line columns.

FIG. 9 shows in a screenshot the report described in Example 1 (FIG. 8) with a string concatenation function applied to the year and product line columns. This calculation, which is not natively supported by the OLAP data source in this example, results on concatenation each year and each product line in each row of the report.

Example 3

Figure 10:
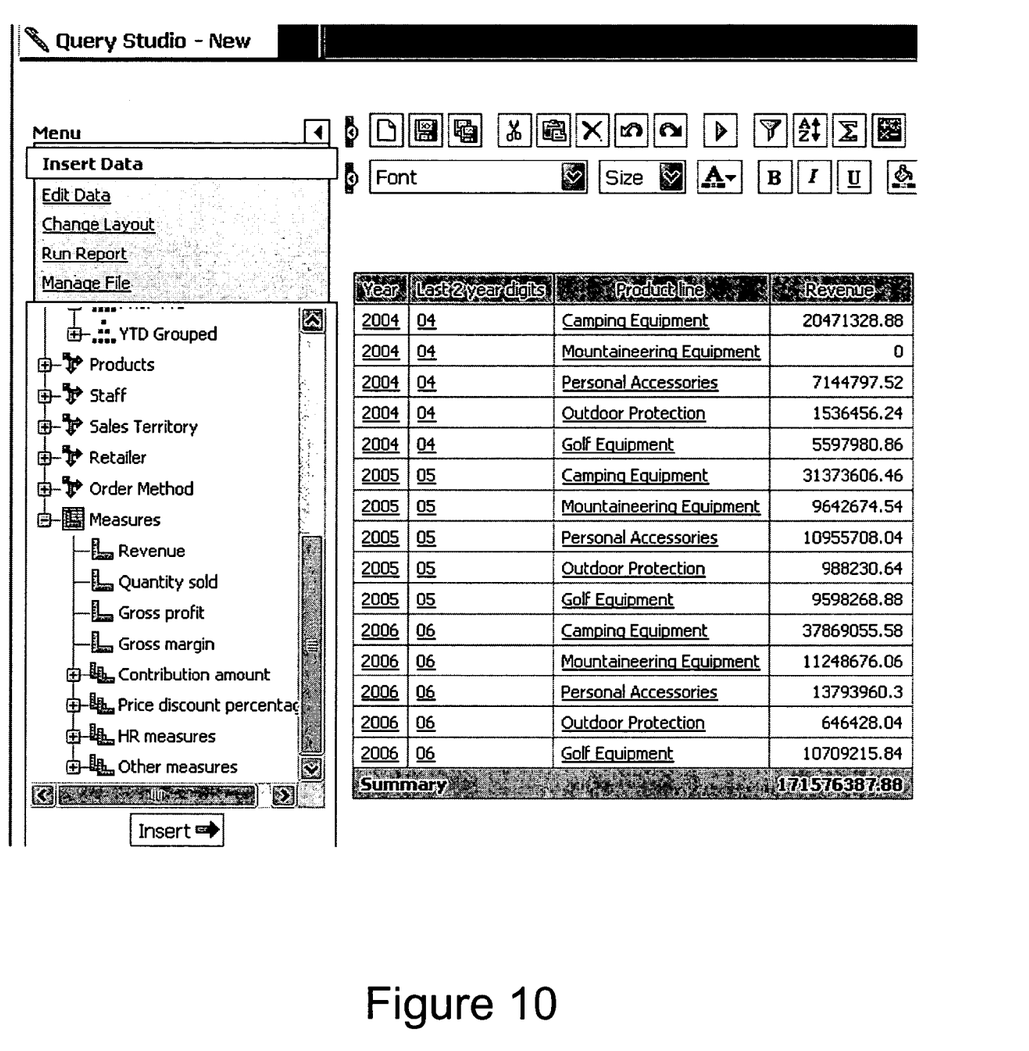
FIG. 10 shows in a screenshot the report as in FIG. 8 with a substring function applied to the year column.

FIG. 10 shows in a screenshot the report described in Example 1 (FIG. 8) with a substring function applied to the year column. The last two characters of each string year caption is computed for each year row value.

Example 4

Figure 11:
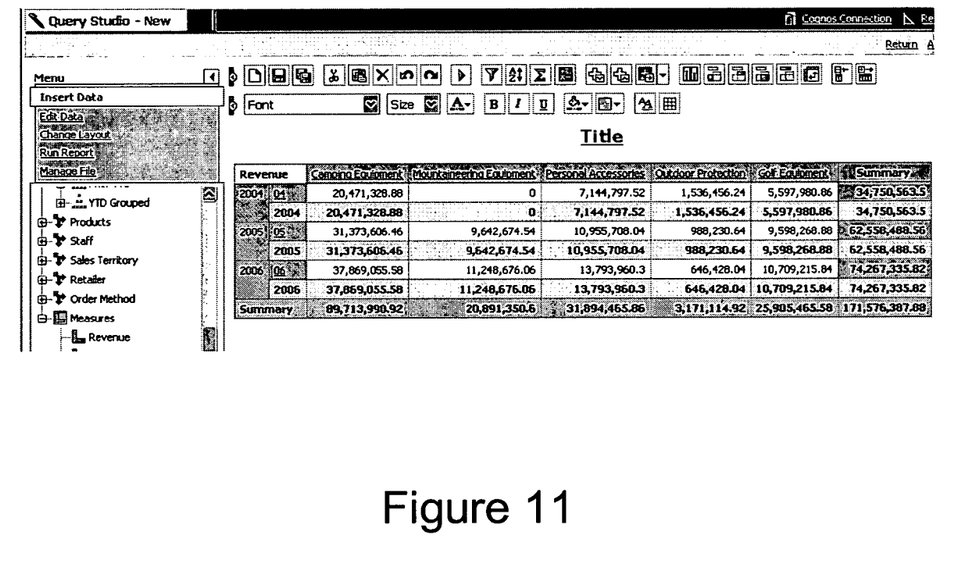
FIG. 11 shows in a screenshot the report as in FIG. 10 presented in a dimensional view called a cross tabulation.

FIG. 11 shows in a screenshot the report in example 3 (FIG. 10) presented in a dimensional view called a cross tabulation.

The systems and methods according to the present invention may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A tabular operation provider for processing a data agnostic business intelligence query, the tabular operation provider comprising: a processor; and a memory, the memory containing:
a query interceptor detecting and intercepting a data agnostic business intelligence (BI) query issued against a multidimensional data source, wherein the data agnostic BI query combines at least one online analytical processing (OLAP) query element and at least one relational style function not natively supported by the multidimensional data source wherein the relational style function comprises one of a date arithmetic function and a string manipulation function;
a query decomposer decomposing an expression in the data agnostic business intelligence query into a decomposed multidimensional expression, based on the OLAP-query element and a decomposed relational expression, based on the relational style function, wherein the query decomposer comprises:
a sub-expression identifier identifying if a part of the expression includes the relational style function that is not supported by an OLAP query provider, and
an OLAP query provider sub-Query creator creating an OLAP query provider (GOP) operation sub-Query based on the part of the expression that is supported by the OLAP query provide; and
a query replacer replacing the data agnostic business intelligence query with a stack of operations expressed by the decomposed multidimensional expression and/or the decomposed relational expression, wherein the query replacer identifies one or more operations expressed by the decomposed multidimensional expression to send to the OLAP query provider executing multidimensional query operations, and identifies one or more operations expressed by the decomposed relational expression to send to a relational query provider executing relational query operations.

2. The tabular operation provider as recited in claim 1, wherein the query decomposer further comprises:
a relational expression extractor extracting a relational sub-expression in the data agnostic BI query into relational query data items;
an OLAP query item creator for creating a data item in a query of the OLAP query provider for each BI query data item; and
an expression replacer replacing the relational sub-expression with references to corresponding BI query items.

3. The tabular operation provider as recited in claim 1, wherein the query decomposer uses an operation support table describing operations supported by the OLAP query provider.

4. A method of processing a data agnostic business intelligence query against a multidimensional data source, the method comprising the steps of:
detecting and intercepting a data agnostic business intelligence (BI) query issued against a multidimensional data source, wherein the data agnostic BI query combines a least one online analytical processing (OLAP) query element and at least one relational style function not natively supported by the multidimensional data source, wherein the relational style function comprises one of a date arithmetic function and a string manipulation function;
decomposing an expression in the data agnostic business intelligence query into a decomposed multidimensional expression, based on the OLAP query element and a decomposed relational expression, based on the relational style function wherein decomposing the expression in the data agnostic business intelligence query includes:
(i) identifying if a part of the expression in the query that is not supported by an OLAP query provider, and
(ii) creating an OLAP query provider operation sub-Query based on the part of expression that is supported by the OLAP query provider; and
replacing the data agnostic business intelligence query with a stack of operations expressed by the decomposed multidimensional expression and/or the decomposed relational expression for execution of the operations, wherein replacing the data agnostic business intelligence query with a stack of operations includes:
(i) identifying one or more operations expressed by the decomposed multidimensional expression to send the OLAP query provider executing multidimensional query operations, and
(ii) identifying one or more operations expressed by the decomposed relational expression to send to a relational query provider executing relational query operations.

5. The method as recited in claim 4, wherein the decomposing step further comprises the steps of:
extracting a relational sub-expression in the data agnostic business intelligence query into relational query data items;
creating an OQP data item for each tabular data item in the data agnostic business intelligence; and
replacing the relational sub-expressions OQP items.

6. The method as recited in claim 5 wherein the decomposing step uses an operation support table describing operations supported by OLAP query provider.

7. A computer-readable storage medium containing computer executable instructions, which when read into a memory execute an operation for caring out a method of processing a data agnostic business intelligence query against one or more data source, the method comprising the steps of:
detecting and intercepting a data agnostic business intelligence (BI) query issued against a multidimensional data source, wherein the data agnostic BI query combines at least one online analytical processing (OLAP) query element and at least one relational style function not natively supported by the multidimensional data source, wherein the relational style function comprises one of a date arithmetic function and a string manipulation function;
decomposing an expression in the data agnostic business intelligence query into a decomposed multidimensional expression, based on the OLAP query element, and a decomposed relational expression, based on the relational style function, wherein decomposing the expression in the data agnostic business intelligence query includes:
(i) identifying if a part of the expression in the query that is not supported by an OLAP query provider, and
(ii) creating an OLAP query provider operation sub-query based on the part of expression that is supported by the OLAP query provider; and replacing the data agnostic business intelligence query with a stack of operations expressed by the decomposed multidimensional expression and/or the decomposed relational expression for execution of the operations, wherein replacing the data agnostic business intelligence query with a stack of operations includes:

(i) identifying one or more operations expressed by the decomposed multidimensional expression to send the OLAP query provider executing multidimensional query operations, and (ii) identifying one or more operations expressed by the decomposed relational expression to send to a relational query provider executing relational query operations.

8. The tabular operation provider as recited in claim 1 wherein the sub-expression identifier identifies a part of the expression as a tabular sub-expression not supported by OQP, and the query decomposer further comprises:

a relational expression extractor extracting the identified tabular sub-expression into tabular data items;

a OQP item creator creating a data item in an OQP sub-query for each data agnostic business intelligence data item; and an expression replacer replacing the identified tabular sub-expressions in the data agnostic business intelligence query with data items in the OQP sub-query.

9. The tabular operation provider as recited in claim 1 wherein the query decomposer uses an operation support table describing operations supported by the tabular operation sub-query.

* * * * *